(12) United States Patent
Khan et al.

(10) Patent No.: US 11,727,298 B2
(45) Date of Patent: Aug. 15, 2023

(54) DETERMINING A DISTANCE

(71) Applicant: Telefonaktiebolaget LM Ericsson (publ), Stockholm (SE)

(72) Inventors: Sumsam Ullah Khan, Kista (SE); Ahsan Javed Awan, Spånga (SE); Gemma Vall-Llosera, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 353 days.

(21) Appl. No.: 16/913,327

(22) Filed: Jun. 26, 2020

(65) Prior Publication Data
US 2020/0410381 A1  Dec. 31, 2020

Related U.S. Application Data

(60) Provisional application No. 62/868,116, filed on Jun. 28, 2019.

(30) Foreign Application Priority Data

Aug. 21, 2019 (EP) .................................... 19192860

(51) Int. Cl.
*G06N 10/00* (2022.01)
*G06N 10/60* (2022.01)
*G06N 20/00* (2019.01)
*G06F 17/16* (2006.01)

(52) U.S. Cl.
CPC ............. *G06N 10/00* (2019.01); *G06F 17/16* (2013.01); *G06N 10/60* (2022.01); *G06N 20/00* (2019.01)

(58) Field of Classification Search
None
See application file for complete search history.

(56) References Cited

U.S. PATENT DOCUMENTS

2020/0210755 A1* 7/2020 Luongo ................. G06K 9/628
2020/0342345 A1* 10/2020 Farhi ...................... G06N 3/063

OTHER PUBLICATIONS

M. Schuld, I. Sinayskiy, and F. Petruccione, "An introduction to quantum machine learning," Contemporary Physics, vol. 56, No. 2, pp. 172-185, 2015. doi: 10.1080/00107514.2014.964942, https://arxiv.org/pdf/1409.3097.pdf.
N. Wiebe, A. Kapoor, and K. M. Svore, "Quantum algorithms for nearest-neighbor methods for supervised and unsupervised learning," Quantum Information Computation, vol. 15, No. 3-4, p. 316-356, 2015, https://arxiv.org/pdf/1401.2142.pdf.
(Continued)

*Primary Examiner* — Jay C Chang
(74) *Attorney, Agent, or Firm* — Sage Patent Group

(57) ABSTRACT

Methods and apparatus are disclosed, including an example of a method of determining a distance between a first point and a second point. The method includes manipulating quantum states of at least first and second qubits of a quantum computing device based on a test vector representing the first point and a training vector representing the second point, performing quantum interference between the test vector and the training vector, performing a measurement on one or more of the qubits to determine the distance, and determining the distance from the measurement.

17 Claims, 6 Drawing Sheets

(56) References Cited

OTHER PUBLICATIONS

E. Aïmeur, G. Brassard, and S. Gambs, "Quantum speed-up for unsupervised learning," machine Learning, vol. 90, No. 2, pp. 261-287, 2013. doi: 10.1007/s10994-012-5316-5, https://doi.org/10.1007/s10994-012-5316-5.

P. Rebentrost, M. Mohseni, and S. Lloyd, "Quantum support vector machine for big data classification," Physical Review Letters, vol. 113, No. 13, 2014. doi: 10.1103/PhysRevLett.113.130503, https://arxiv.org/pdf/1307.0471.pdf.

V. Dunjko, Y.-K. Liu, X. Wu, and J. M. Taylor, "Exponential improvements for quantum-accessible reinforcement learning," ArXiv e-prints, 2017, https://arxiv.org/pdf/1710.11160.pdf.

Preskill, "Quantum computing in the nisq era and beyond," Quantum, vol. 2, p. 79, 1995, https://arxiv.org/abs/1801.00862.

S. S. Tannu and M. K.Qureshi, "A case for variability-aware policies for nisq-era quantum computing devices," 2018, https://arxiv.org/abs/1805.10224.

A. Barenco, C. H. Bennett, R. Cleve, D. P. DiVincenzo, N. Margolus, P. Shor, T. Sleator,J. Smolin, and H. Weinfurter, "Elementary gates for quantum computation," Physical Review A, vol. 52, No. 5, pp. 3457-3467, 1995, https://arxiv.org/abs/quant-ph/9503016.

M. Schuld, M. Fingerhuth, and F. Petruccione, "Implementing a distance-based classifier with a quantum interference circuit," EPL (Europhysics Letters), vol. 119, No. 6, 2017. doi: 10.1209/0295-5075/119/60002, https://arxiv.org/pdf/1703.10793.pdf.

S. P. Lloyd, "Least squares quantization in pcm," Information Theory, IEEE Transactions, pp. 129-137, 1982, https://ieeexplore.ieee.org/document/1056489.

D. Kopczyk, "Quantum machine learning for data scientists," 2018. doi: arXiv:1804.10068, https://arxiv.org/abs/1804.10068.

E. Aïmeur, G. Brassard, and S. Gambs, "Machine learning in a quantum world," Advances in Artificial Intelligence, Springer, pp. 431-442, 2006.

M. Möttönen, J. Vartiainen, V. Bergholm, and M. M. Salomaa, "Transformation of quantum states using uniformly controlled rotations," Quantum Information and Computation 5, pp. 467-473, 2005.

R. D. P. Niemann and R. Wille, "Logic synthesis for quantum state generation." IEEE 46th International Symposium on Multiple-Valued Logic, Springer, pp. 247-252, 2016.

V. Giovannetti, S. Lloyd, and L. Maccone, "Quantum random access memory," Physical Review Letters, vol. 100, No. 16, pp. 1484-1509, 2008. doi: 10.1103/PhysRevLett.100.160501, https://arxiv.org/abs/0708.1879.

S. Lloyd, M. Mohseni, and P. Rebentrost, "Quantum algorithms for supervised and unsupervised ma-chine learning," arXiv preprint 1307.0411, 2013.

C. Durr and P. Hoyer, "A quantum algorithm for finding the minimum," 1996. doi: arXiv:quant-ph/96070148, https://arxiv.org/abs/quant-ph/9607014.

V. A. Epanechnikov, "Non-parametric estimation of a multivariate probability density," Theory of Probability its Applications, pp. 153-158, 1969.

A. Elisseeff and J. Weston, "A kernel method for multi-labelled classification," Advances in neural information processing systems, pp. 681-687, 2002, https://papers.nips.cc/paper/1964-a-kernel-method-for-multi-labelled-classification.pdf.

R. A. Fisher, "The use of multiple measurements in taxonomic problems," Annals of Eugenics, 7(2), pp. 179-188, 1936.

D.O. Loftsgaarden and C.P. Quesenberry, "A Nonparametric Estimate of a Multivariate Density Function," Annals of Mathematical Statistics, vol. 36, No. 3, 1965, pp. 1049-1051.

Sébastien Gambs, Esma Aïmeur and Gilles Brassard, "Machine Learning in a Quantum World," Advanced in Artificial Intelligence, Proceedings of the 19$^{th}$ Conference of the Canadian Society for Computational Studies of Intelligence, Canadian AI 2006, Québec City, Québec, Canada, Jun. 7-9, 2006, pp. 431-442.

\* cited by examiner

DETERMINING A DISTANCE

CROSS REFERENCE TO RELATED APPLICATIONS

This application claims priority to European Patent Application No. 19192860.5, filed on Aug. 21, 2019, which in turn claims domestic priority to U.S. Provisional Patent Application No. 62/868,116, filed on Jun. 28, 2019, the contents of both of which are incorporated by reference herein in their entirety.

TECHNICAL FIELD

Examples of the present disclosure relate to determining a distance, such as for example between two points, and for classifying a test vector. Some examples may use a quantum computing device.

BACKGROUND

1.

Machine learning may be used in many areas of technology. For example, automation of management in communications networks may use machine learning algorithms and techniques including, for example, support vector machine (SVM), K-Means, Linear regression and other examples. In some examples, machine learning techniques may predict when a cell may encounter a load issue or a failure, or may detect or predict other anomalies. Machine learning algorithms may be both computationally intensive and required to handle large volumes of data. This has led to interest in specialized accelerators for such techniques. Quantum computing devices are an example, and using quantum computing devices to execute machine learning algorithms may require redesign of those algorithms to exploit the principles of quantum mechanics.

Literature has been produced that relates to Quantum Machine Learning (QML), such as for example in reference [1]. QML techniques are being developed that can solve machine learning (ML) problems faster than the best known classical algorithms for the same problems. Supervised (e.g. support vector machines), un-supervised (e.g. clustering) and reinforcement quantum machine learning techniques have been proposed that provide exponential speed-ups as compared to their classical counterparts, such as for example in references [2-5].

Quantum algorithms may be executed on real quantum computing devices, but there are certain limitations to what can be achieved with current noisy quantum computing devices. Noisy quantum computing devices, which may also be termed as Noisy Intermediate Scale Quantum computing devices (NISQ), may have insufficient fault tolerance [6]. Furthermore, qubits on current quantum devices have low coherence times and the superposition of the qubits is quickly lost, which may lead to decoherence and errors in the computation [7]. Algorithm implementations with shallow depth quantum circuits may provide better results on current term noisy quantum devices, considering that the complexity of an implementation is measured as the total number of elementary gates required to build the circuit [8].

K-means clustering [10] is an unsupervised machine learning algorithm that groups together M observations into k clusters, making sure intra cluster variance is minimized. Centroids of each cluster are recomputed and datapoints are reassigned iteratively until convergence is achieved. Time complexity of the classical version of the algorithm is dependent on the number of features N in the input vectors and total number of datapoints M.

Quantum k means clustering may provide an exponential speed increase for very high dimensional input vectors. The speed increase arises due to the observation that only log N qubits are required to load a vector with N dimensions. One existing solution of the quantum k means algorithm is described in reference [11]. It uses three different quantum subroutines to perform the k-means clustering: SwapTest, DistCalc and Grover's Optimization. The SwaptTest subroutine, that was first used in reference [12], measures the overlap between two quantum states $\langle a|b \rangle$ based on the measurement probability of the control qubit in state $|0\rangle$. States $|a\rangle$ and $|b\rangle$ can be unknown prior to running the subroutine, and only a measurement on the control qubit is required. The quantum circuit 100 for SwapTest is shown in FIG. 1. The states $|a\rangle$ and $|b\rangle$ consist of n qubits each. They are either prepared using amplitude encoding as in references [13, 14] or they can be loaded directly from Quantum Random Access Memory (QRAM) [15]. The overlap is then calculated by performing a measurement on the control qubit. The overlap calculated from SwapTest is then used in the DistCalc routine that is described in reference [16] to calculate k distances to each cluster centroid. Grover's Optimization [17] is based on Grover's algorithm to find the index of the minimum element, which is then used to find the nearest centroid. The whole process 200 for assigning cluster to one data point is displayed as a flowchart in FIG. 2. This is repeated for each data point in the dataset.

SUMMARY

One aspect of the present disclosure provides a method of determining a distance between a first point and a second point. The method comprises manipulating quantum states of at least first and second qubits of a quantum computing device based on a test vector representing the first point and a training vector representing the second point, performing quantum interference between the test vector and the training vector, performing a measurement on one or more of the qubits to determine the distance, and determining the distance from the measurement.

Another aspect of the present disclosure provides a method of classifying a test vector. The method comprises, for each of a plurality of training vectors, determining a distance between a first point represented by the test vector and a respective point represented by the training vector using the method of determining a distance between a first point and a second point according to the aspect above. The method also includes classifying the test vector based on the determined distances.

A further aspect of the present disclosure provides a method of classifying a test vector. The method comprises the steps of, for each of a plurality of qubits in a quantum computing device:

a) manipulating the quantum state of the qubit based on a first angle representing the test vector;
b) manipulating the quantum state of the qubit based on a second angle representing a respective training vector corresponding to the qubit; and
c) obtaining a measurement that is indicative of the probability of the qubit being in a first quantum state, and the method further comprises the step of:
d) classifying the test vector based on the obtained measurements.

A still further aspect of the present disclosure provides apparatus for determining a distance between a first point and a second point. The apparatus comprises a processor and a memory. The memory contains instructions executable by the processor such that the apparatus is operable to manipulate quantum states of at least first and second qubits of a quantum computing device based on a test vector representing the first point and a training vector representing the second point, perform quantum interference between the test vector and the training vector, perform a measurement on one or more of the qubits to determine the distance, and determine the distance from the measurement.

An additional aspect of the present disclosure provides apparatus for classifying a test vector. The apparatus comprises a processor and a memory. The memory contains instructions executable by the processor such that the apparatus is operable to, for each of a plurality of training vectors, determine a distance between a first point represented by the test vector and a respective point represented by the training vector using the method of determining a distance between a first point and a second point as disclosed above. The memory also contains instructions executable by the processor such that the apparatus is further operable to classify the test vector based on the determined distances.

Another aspect of the present disclosure provides apparatus for classifying a test vector. The apparatus comprises a processor and a memory. The memory contains instructions executable by the processor such that the apparatus is operable to, for each of a plurality of qubits in a quantum computing device:
  a) manipulate the quantum state of the qubit based on a first angle representing the test vector;
  b) manipulate the quantum state of the qubit based on a second angle representing a respective training vector corresponding to the qubit; and
  c) obtain a measurement that is indicative of the probability of the qubit being in a first quantum state,
and the memory contains instructions executable by the processor such that the apparatus is further operable to:
  d) classify the test vector based on the obtained measurements.

A further aspect of the present disclosure provides apparatus for determining a distance between a first point and a second point. The apparatus is configured to manipulate quantum states of at least first and second qubits of a quantum computing device based on a test vector representing the first point and a training vector representing the second point, perform quantum interference between the test vector and the training vector, perform a measurement on one or more of the qubits to determine the distance, and determine the distance from the measurement.

A still further aspect of the present disclosure provides apparatus for classifying a test vector. The apparatus is configured to, for each of a plurality of training vectors, determine a distance between a first point represented by the test vector and the point represented by the training vector using the method of determining a distance between a first point and a second point as disclosed above. The apparatus is further configured to classify the test vector based on the plurality of determined distances.

An additional aspect of the present disclosure provides apparatus for classifying a test vector. The apparatus is configured to, for each of a plurality of qubits in a quantum computing device:
  a) manipulate the quantum state of the qubit based on a first angle representing the test vector;
  b) manipulate the quantum state of the qubit based on a second angle representing a respective training vector corresponding to the qubit;
  c) obtain a measurement that is indicative of the probability of the qubit being in a first quantum state,
and the apparatus is further configured to:
  d) classify the test vector based on the obtained measurements.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
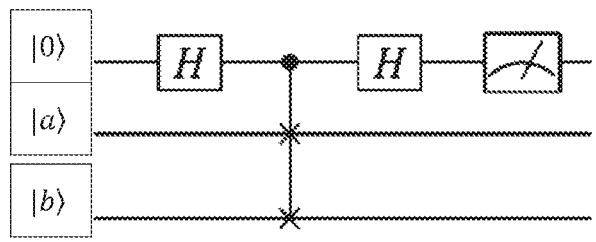
FIG. 1 shows an example of a quantum circuit for SwapTest.
Figure 2:
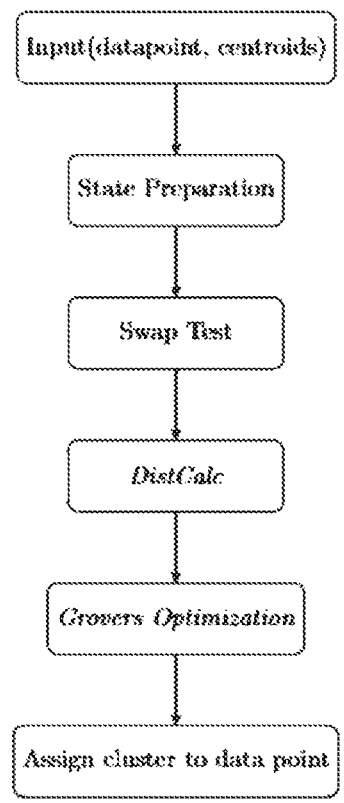
FIG. 2 is a flow chart of an example of a process for assigning cluster to one data point.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computing devices. Nodes that communicate using the air interface also have suitable radio communications circuitry. Moreover, where appropriate the technology can additionally be considered to be embodied entirely within any form of computing device-readable memory, such as solid-state memory, magnetic disk, or optical disk containing an appropriate set of computing device instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Quantum computing devices may be performance-limited by the coherence time of the qubits. This, in turn, implies that only short depth circuits can be executed. Quantum circuit simulators may also be executed on classical computing devices to simulate the quantum algorithms, but they are also limited in processing power by the bit limitation of the classical computing devices.

Existing solutions for quantum distance-based classification (such as, for example, the solution presented in reference [9]), although providing a framework for using interference for distance-based classification, are designed for experimental implementation of a specific example from the Iris Dataset [20]. Using the proposed framework to prepare an arbitrary state for any input vectors requires more quantum operations, which results in a longer depth quantum circuit. A longer depth quantum circuit may not perform well on current noisy quantum computing devices and may be prone to providing inaccurate results.

Furthermore, NISQ computing devices can be limited by the interconnection of the qubits of the device (for example, where the connections of the qubits of the device are not meshed connections). This can limit the design of the circuit of the NISQ computing device and thus increase the number of gates required to solve a specific problem.

Examples of the present disclosure may determine distances between two points (e.g. Euclidian distances), for example using NISQ computing devices. The distance determined may be applied to k-means clustering (e.g. quantum k-means clustering). In some examples, destructive interference is used to calculate distances between points or vectors. These distances may then be used to find the nearest training point, training vector or centroid.

Figure 3:
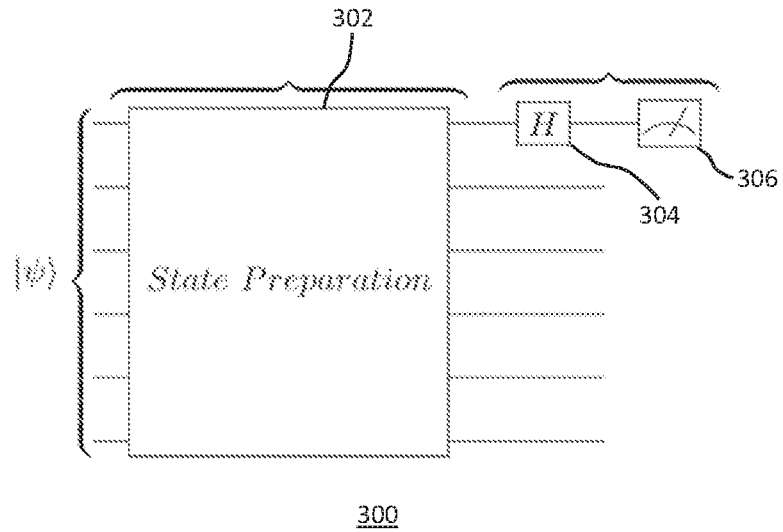
FIG. 3 shows an example of a general quantum interference circuit.

An example of a general quantum interference circuit 300 is shown in FIG. 3. The circuit 300 comprises six qubits, but it will be appreciated that a quantum interference circuit may comprise any suitable number of qubits. The circuit 300 includes a first stage 302 for preparing a quantum state. In this illustrative example, the quantum state $|\psi\rangle$ represents a six qubit quantum state that is prepared at and output from the first stage 302. The circuit 300 also includes a second stage 304 for performing interference on the prepared quantum state, and a third stage 306 for performing a measurement on the resulting quantum state. In the third stage 306, a measurement may be made of one or more of the qubits.

Given two two-dimensional vectors, $\vec{t}=[t_x, t_y]$ and $\vec{c}=[c_x, c_y]$, the Euclidean distance, d, between these two vectors may be calculated as:

$$d(\vec{t},\vec{c})=\sqrt{(t_x-c_x)^2+(t_y-c_y)^2}$$

Figure 4:
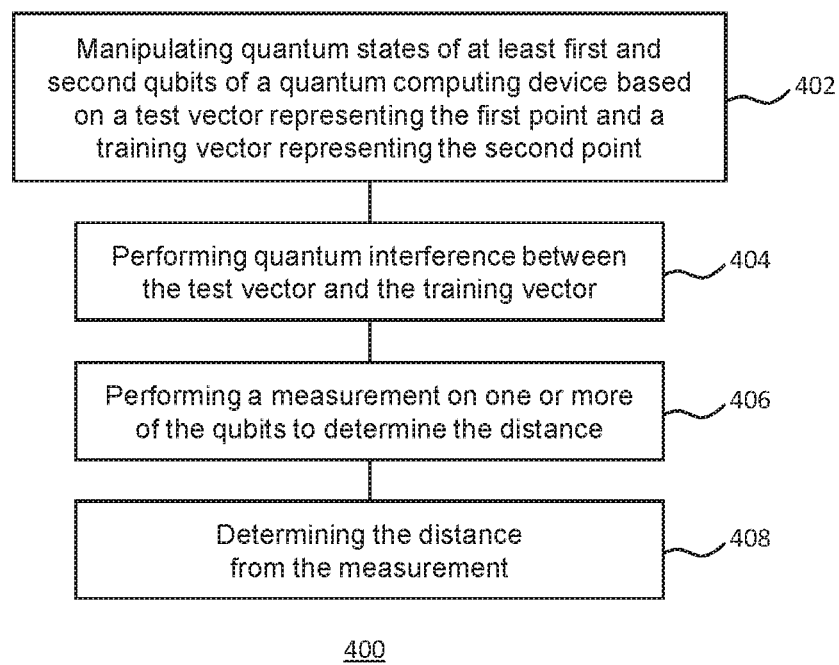
FIG. 4 is a flow chart of an example of a method of determining a distance between a first point and a second point.

FIG. 4 is a flow chart of an example of a method 400 of determining a distance between a first point and a second point. The method may be performed in some examples on a computing device, such as a quantum computing device or a classical computing device, or may be performed partially using a quantum computing device and partially using a classical computing device. The method 400 comprises, in step 402, manipulating quantum states of at least first and second qubits of a quantum computing device based on a test vector representing the first point and a training vector representing the second point.

In some embodiments, manipulating the quantum states of at least first and second qubits may prepare a quantum state that represents the test vector and the training vector. For example, where the test vector may be represented by the two-dimensional vector $\vec{t}=[t_x, t_y]$, and where the training vector may be represented by the two-dimensional vector $\vec{c}=[c_x, c_y]$, the prepared quantum state may be represented as:

$$|\psi\rangle = \begin{bmatrix} t'_x \\ t'_y \\ c'_x \\ c'_y \end{bmatrix}$$

In this example, the prepared quantum state represents the normalised test vector $\vec{t'}=[t'_x, t'_y]$, and the normalised training vector $\vec{c'}=[c'_x, c'_y]$. In some examples, the normalised components of the test vector $\vec{t'}$ and the normalised components of the training vector $\vec{c'}$ may be calculated as follows:

$$t'_x = \frac{t_x}{\text{Norm}}, t'_y = \frac{t_y}{\text{Norm}}, c'_x = \frac{c_x}{\text{Norm}}, c'_y = \frac{c_y}{\text{Norm}}$$

wherein Norm=$\sqrt{t_x^2+t_y^2+c_x^2+c_y^2}$.

In some embodiments, quantum interference may be performed on a prepared quantum state. In some examples, quantum interference may be performed by applying a Hadamard gate to a prepared quantum state. For example, on application of a Hadamard gate to the prepared quantum state $|\psi\rangle$ as defined above, the resultant quantum state $|\phi\rangle$ may be formed as follows:

$$|\phi\rangle = \frac{1}{\sqrt{2}}\begin{bmatrix} 1 & 0 & 1 & 0 \\ 0 & 1 & 0 & 1 \\ 1 & 0 & -1 & 0 \\ 0 & 1 & 0 & -1 \end{bmatrix}\begin{bmatrix} t'_x \\ t'_y \\ c'_x \\ c'_y \end{bmatrix} = \frac{1}{\sqrt{2}}\begin{bmatrix} t'_x + c'_x \\ t'_y + c'_y \\ t'_x - c'_x \\ t'_y - c'_y \end{bmatrix}\begin{array}{l}|00\rangle \\ |01\rangle \\ |10\rangle \\ |11\rangle\end{array}$$

It will be appreciated that, in this example, the quantum state $|00\rangle$ represents constructive interference between the first component $t_x'$ of the normalized test vector, and the first component $c_x'$ of the normalized training vector. The quantum state $|01\rangle$ represents constructive interference between the second component $t_y'$ of the normalized test vector, and the second component $c_x'$ of the normalized training vector. The quantum state $|10\rangle$ represents destructive interference between the first component of the normalized test vector and the first component of the normalized training vector. Finally, the quantum state $|11\rangle$ represents destructive interference between the second component of the normalized test vector and the second component of the normalized training vector. In other examples, no normalization of the test and training vectors may be performed, for example as they are treated as unit length vectors. In examples disclosed herein, when referring to test and training vectors, the normalized or unnormalized form of these vectors may be used unless where otherwise stated. Hereinafter, the normalized form of the vectors (or where no normalization is performed) will be referred to as the test and training vectors, whereas the unnormalized form (where appropriate) will be referred to as the unnormalized test vector and unnormalized training vector.

A measurement may be performed on one or more of the qubits following interference, wherein the quantum state of the qubits is represented by $|\phi\rangle$. In some examples, the measurement may be indicative of a probability of the most significant qubit being in the quantum state $|1\rangle$. In other words, the measurement may be indicative of the probability:

$$P|1\rangle = \frac{1}{2}[(t_x'-c_x')^2+(t_y'-c_y')^2]$$

This obtained measurement indicative of the probability may then be used to determine the Euclidean distance, d, between the first point represented by the test vector, and the second point represented by the training vector, as follows:

$$d(t,c) = \text{Norm} \times \sqrt{2}\sqrt{P|1\rangle}$$

Thus, for example, the measurement indicative of the probability may be combined with the Norm factor (where the vectors are normalized) to provide the distance result. It will therefore be appreciated that, in some examples, by manipulating the quantum states of at least first and second qubits of a quantum computing device, a training vector becomes entangle with the $|1\rangle$ quantum state of the second qubit, and a test vector becomes entangled with the $|0\rangle$ quantum state of the second qubit. In some examples, by performing quantum interference between the test vector and the training vector (entangled with the second qubit in the manner as described above), a resulting quantum state of the qubits may be formed that comprises information relating to constructive interference between the test vector and the training vector, and further comprises information relating to destructive interference between the test vector and the training vector. It will be appreciated that, by performing a measurement on one or more of the qubits, information related to the destructive interference between the test vector and the training vector may be obtained, and this information may be used to determine a distance between a first point represented by the test vector, and a second point represented by the training vector.

Figure 5:
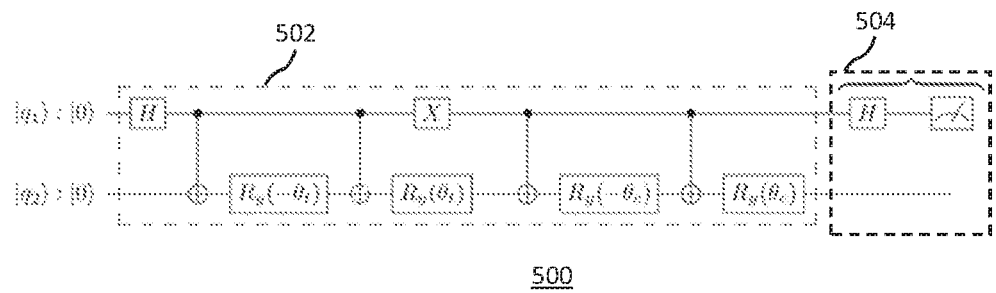
FIG. 5 is an example of a quantum circuit that may be used with the method of FIG. 4.

FIG. 5 is an example of a quantum circuit 500 that may be used with the method 400 of FIG. 4. The circuit 500 includes two qubits, $|q_1\rangle$, $|q_2\rangle$, which are initially $|0\rangle$. The quantum circuit 500 includes a first part 502 to load a test vector representing a first point, and a training vector representing a second point. The test vector representing the first point has angle $\theta_t$ in polar coordinates. The training vector representing the second point has angle $\theta_c$ in polar coordinates. The first part 502 comprises a Hadamard gate on $|q_1\rangle$, a controlled NOT (CNOT) gate on $|q_2\rangle$ controlled by $|q_1\rangle$, a rotation by $-\theta_t$ on $|q_2\rangle$, a second CNOT gate on $q_2\rangle$ controlled by $|q_1\rangle$, and a second rotation by $\theta_t$ on $|q_2\rangle$. There is also a NOT gate on $|q_1\rangle$ following the second CNOT gate. The first part 502 further comprises a controlled NOT (CNOT) gate on $|q_2\rangle$ controlled by $|q_1\rangle$, a rotation by $-\theta_c$ on $|q_2\rangle$, a second CNOT gate on $|q_2\rangle$ controlled by $|q_1\rangle$, and a second rotation by $\theta_c$ on $|q_2\rangle$. The first part 502 may therefore prepare a quantum state that represents the components of the test vector, and the components of the training vector, in a similar manner as described above.

This is followed by a second part 504 for interference and measurement, and includes a Hadamard gate on $|q_1\rangle$ followed by a measurement on $|q_1\rangle$. The quantum circuit 500 is merely an example of a quantum circuit that could be used to implement at least part of the method 400.

Referring back to FIG. 4, the method 400 proceeds to step 404 comprising performing quantum interference between the test vector and the training vector. Next, in step 406, a measurement is performed on one or more of the qubits, and then step 408 comprises determining the distance from the measurement.

In some examples, the step of manipulating the quantum states of the qubits may comprise performing a first rotation operation on the first qubit by a first angle based on the test vector (for example, $-\theta_t$), performing a second rotation operation on the first qubit by a second angle based on the test vector (for example, $\theta_t$), performing a third rotation operation on a first qubit by a third angle based on the training vector (for example, $-\theta_c$), and performing a fourth rotation operation on a first qubit by a fourth angle based on the training vector (for example, $\theta_c$). These may comprise for example the rotations in the first part 502 of the quantum circuit 500 shown in FIG. 5. In some examples, the second angle is a negative of the first angle. For example, the first rotation may comprise a rotation by an angle between the test vector and the x-axis (also referred to herein as the quantum $|0\rangle$ state), and the second rotation may be by the negative of this angle. Additionally or alternatively, in some examples, the fourth angle is a negative of the third angle. For example, the third rotation may comprise a rotation by an angle between the training vector and the x-axis or $|0\rangle$ state, and the fourth rotation may be by the negative of this angle.

The method 400 may in some examples comprise performing a first controlled NOT, CNOT, operation on the first qubit that is controlled by the second qubit, wherein the CNOT operation is performed before the first rotation operation. This may correspond for example to the first CNOT gate in the first part 502 of the quantum circuit 500. Additionally or alternatively, the method 400 may in some examples comprise performing a second controlled NOT, CNOT, operation on the first qubit that is controlled by the second qubit, wherein the CNOT operation is performed before the second rotation operation. This may correspond for example to the second CNOT gate in the first part 502 of the quantum circuit 500. Additionally or alternatively, the method 400 may in some examples comprise performing a third controlled NOT, CNOT, operation on the first qubit that is controlled by the second qubit, wherein the CNOT operation is performed before the third rotation operation. This may correspond for example to the third CNOT gate in the first part 502 of the quantum circuit 500. Additionally or alternatively, the method 400 may in some examples comprise performing a fourth controlled NOT, CNOT, operation on the first qubit that is controlled by the second qubit, wherein the CNOT operation is performed before the fourth rotation operation. This may correspond for example to the fourth CNOT gate in the first part 502 of the quantum circuit 500. Additionally or alternatively, the method 400 may in some examples comprise performing a NOT operation on the second qubit, wherein the NOT operation is performed before the third and fourth rotation operations. This may correspond for example to the NOT gate in the first part 502 of the quantum circuit 500. The initial state of the first qubit and/or the second qubit may comprise $|0\rangle$. In some examples, at least some of these operations comprise manipulating the quantum states of the qubits to. In some examples, at least some of these NOT and/or CNOT operations may have the result of entangling the training vector with a first quantum state of the second qubit (e.g. $q_1$ as shown in FIG. 5), and/or entangling the test vector with a second quantum state of the second qubit. In some examples, the first quantum state comprises |1⟩ and the second quantum state comprises |0→⟩.

In some examples, manipulating the quantum states of the qubits of a quantum computing device comprises one or more of performing a rotation on the first qubit using a first quantum rotation gate based on the test vector, performing a rotation on the first qubit using a second quantum rotation gate based on the test vector, performing a rotation on the first qubit using a third quantum rotation gate based on the training vector, and performing a rotation on the first qubit using a first fourth quantum rotation gate based on the training vector. For example, one or more of these quantum rotation gates may be the rotation gates shown in the first part 502 of the quantum circuit 500 of FIG. 5.

Figure 6:
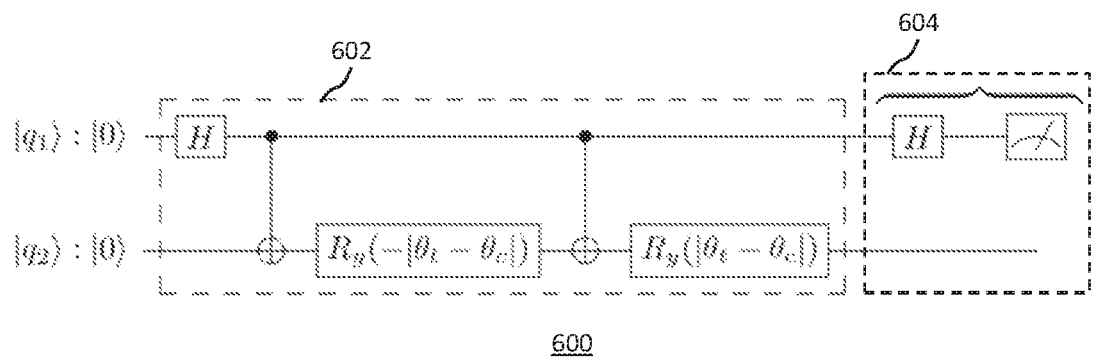
FIG. 6 is another example of a quantum circuit that may be used with the method of FIG. 4.

In some examples, the step of manipulating quantum states of at least first and second qubits of a quantum computing device comprises manipulating the quantum states based on a first vector, wherein the magnitude of the angle between the first vector and a first quantum state is equal to the magnitude of the angle between the test vector and the training vector. Such examples may be implemented for example using the quantum circuit 600 shown in FIG. 6. The circuit 600 includes two qubits, $|q_1\rangle$, $|q_2\rangle$, which may initially be |0⟩. The quantum circuit 500 includes a first part 602 to load a first vector wherein the magnitude of the angle between the first vector and a first quantum state is equal to the magnitude of the angle between the test vector and the training vector. The first vector has angle $\theta_t - \theta_c$ in in polar coordinates. The first part 602 comprises a Hadamard gate on $|q_1\rangle$, a controlled NOT (CNOT) gate on $|q_2\rangle$ controlled by $|q_1\rangle$, a rotation by $-\theta_t - \theta_c$ on $|q_2\rangle$, a second CNOT gate on $|q_2\rangle$ controlled by $|q_1\rangle$, and a second rotation by $|\theta_t - \theta_c|$ on $|q_2\rangle$.

This is followed by a second part 604 for interference and measurement, and includes a Hadamard gate on $|q_1\rangle$ followed by a measurement on $|q_1\rangle$. The quantum circuit 600 is merely an example of a quantum circuit that could be used to implement at least part of the method 400.

In some examples, the step of manipulating the quantum states of the qubits comprises performing a first rotation operation on a first qubit by a first angle based on the first vector (for example, $-|\theta_t - \theta_c|$), and performing a second rotation operation on the first qubit by a second angle based on the first vector (for example, $|\theta_t - \theta_c|$). These may comprise for example the rotations in the first part 602 of the quantum circuit 600 shown in FIG. 6. In some examples, the second angle is a negative of the first angle. Some embodiments of this disclosure recognise that an interference pattern performed using e.g. a Hadamard gate is the same or substantially the same if the relevant angles are loaded with the same angular difference as if the absolute angles are loaded. So, for example, the angular difference between the test and training vectors loaded in the circuit 500 of FIG. 5 may be the same as the angular difference between the first vector loaded in the circuit 600 of FIG. 6 and the x-axis. Thus, the interference pattern and thus state probabilities provided by the circuits 500 and 600 may be identical or similar.

The method 400 may in some examples comprise performing a first controlled NOT, CNOT, operation on the first qubit that is controlled by the second qubit, wherein the CNOT operation is performed before the first rotation operation. This may correspond for example to the first CNOT gate in the first part 602 of the quantum circuit 600. Additionally or alternatively, the method 400 may in some examples comprise performing a second controlled NOT, CNOT, operation on the first qubit that is controlled by the second qubit, wherein the CNOT operation is performed before the second rotation operation. This may correspond for example to the second CNOT gate in the second part 602 of the quantum circuit 600. The initial state of the first qubit and/or the second qubit may comprise |0⟩. At least some of these operations may be manipulating the qubits according to step 402 of the method 400.

In some examples, manipulating the quantum states of qubits of a quantum computing device comprises one or more of performing a rotation on the first qubit using a first quantum rotation gate based on the first vector, and performing a rotation on the first qubit using a second quantum rotation gate based on the first vector. For example, these rotations may be performed by the rotation gates in the first part 602 of the quantum circuit 600 of FIG. 6. It will be appreciated that, in the quantum circuit 600 of FIG. 6, only one vector (the first vector) is loaded onto the quantum circuit 600. In this example, the test vector effectively lies flat on the x-axis, and as the qubit $|q_2\rangle$ is initially in the |0⟩ quantum state, no modification of the $|q_2\rangle$ state is required to load this vector onto the quantum circuit 600. The first vector (which represents the angular difference between the test and training vectors) is then loaded onto the quantum circuit 600.

In some examples, the step of performing quantum interference between the test vector and the training vector results in a quantum state of the second qubit wherein a first state of the second qubit represents destructive interference between the test vector and the training vector, and a second state of the second qubit represents constructive interference between the test vector and the training vector. Thus, in some examples, a measurement is made of the qubits that is indicative of the destructive interference, e.g. is indicative of the probability of a qubit (e.g. $q_1$) being in a particular state. In this case, the measurement may be indicative of the probability of the qubit being in the |1⟩ state.

The method of determining the distance may in some examples be used as part of a k-means or clustering algorithm.

In some examples, manipulating the quantum states entangles the training vector with a first quantum state of the second qubit, and/or entangles the test vector with a second quantum state of the second qubit. This may be achieved for example in the quantum circuit 500 of FIG. 5, where the entanglement is achieved using the particular CNOT and rotation gates. In the quantum circuit 600 shown in FIG. 6, this can be achieved for example by considering that the input vectors are rotated by an angle $-\theta_c$ corresponding to the training vector (though with the opposite sign). This has the effect of making the training vector effectively flat on the x-axis, and thus with the initial state of the qubits being |0⟩, no further rotations are required to input the training vector into the circuit 600.

Figure 7:
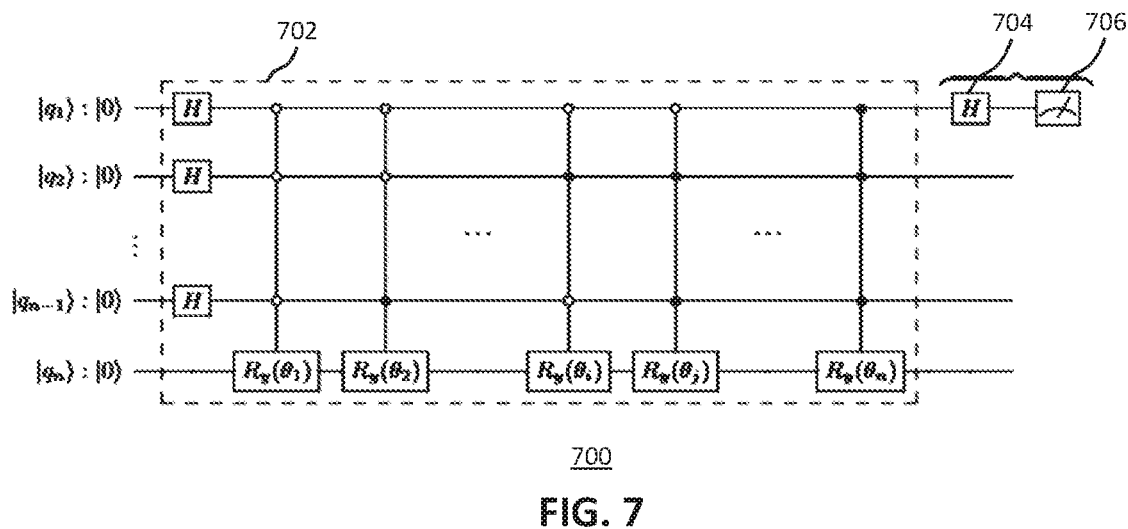
FIG. 7 is another example of a quantum circuit that may be used with the method of FIG. 4.

The examples given above use two-dimensional test and training vectors. However, other examples may be generalized to vectors having any number of dimensions. FIG. 7 is an example of a quantum circuit 700 where the vectors may have a higher number of dimensions. The circuit 700 has n qubits $|q_1\rangle \ldots |q_n\rangle$ and includes a first part 702 to prepare a quantum state |ψ⟩.

Given two vectors of N dimensions each, $a=[a_0, a_1, \ldots, a_N]$ and $b=[b_0, b_1, \ldots, b_N]$, assuming that N is a power of 2, the circuit 700 may have at least $\log_2 N$ qubits to load each vector in the quantum circuit, so in total the circuit may have at least $\log_2 2N$ qubits. If the number of dimensions of the vectors is initially not a power of 2, the vectors may be padded with zeros so that the number of dimensions N is a power of 2. The Euclidean distance between these two vectors is calculated as, $$d(a,b) = \sqrt{(a_0-b_0)^2 + \ldots + (a_N-b_N)^2}$$

A quantum state is prepared using normalized vectors a' and b' (or these vectors may be identical to a and b in examples where no normalization occurs), where vector a is encoded where the most significant qubit is in state $|0\rangle$ and vector b is encoded on the $|1\rangle$ state of the most significant qubit. The state can be written as, $$|\psi\rangle = 1/\sqrt{2}(|0,a'\rangle + |1,b'\rangle)$$

$$|\psi\rangle = [a_0', a_1', \ldots, a_N', b_0', b_1', \ldots, b_N']$$

where a' and b' are the normalized vectors a and b, and $$\text{Norm} = \sqrt{\sum_{i=0}^{N-1} a_i^2 + \sum_{i=0}^{N-1} b_i^2}$$

$$a' = \frac{a}{\text{Norm}}, \quad b' = \frac{b}{\text{Norm}}$$

Applying the Hadamard gate on the most significant qubit on the state $|\psi\rangle$, $$|\phi\rangle = H|\psi\rangle = \frac{1}{\sqrt{2}} \begin{pmatrix} a_0' + b_0' \\ a_1' + b_1' \\ \ldots \\ a_N' + b_N' \\ a_0' - b_0' \\ a_1' - b_1' \\ \ldots \\ a_N' - b_N' \end{pmatrix}$$

The probability of the most significant qubit in $|\phi\rangle$ to be in state $|1\rangle$ is given by, $$P|1\rangle = \frac{1}{2}[(a_0'-b_0')^2 + \ldots + (a_N'-b_N')^2]$$

Using this probability the distance is calculated as follows, $$d(a,b) = \text{Norm} \times \sqrt{2}\sqrt{P|1\rangle}$$

Referring back to FIG. 7, the first part 702 of the circuit 700 includes rotations using angles that correspond to the following:

$$\theta_1 = \arctan\left(\frac{a_2}{a_1}\right), \theta_2 = \arctan\left(\frac{a_4}{a_3}\right), \ldots, \theta_n = \arctan\left(\frac{b_N}{b_{N-1}}\right)$$

The circuit 700 also includes a Hadamard gate 704 on the most significant qubit $|q_1\rangle$ for interference and measurement 706 on $|q_1\rangle$. The initial state of all of the qubits is $|0\rangle$.

Figure 8:
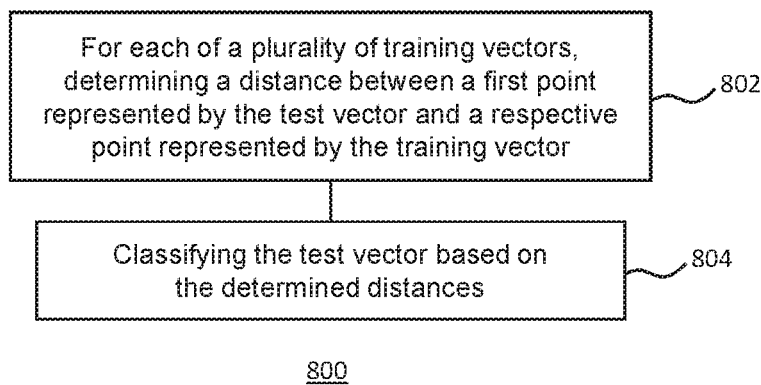
FIG. 8 is a flow chart of an example of a method of classifying a test vector.

The methods provided herein for determining a distance may be used for example in vector classification. FIG. 8 is a flow chart of an example of a method 800 of classifying a test vector (for example, in a quantum k-means algorithm). The method 800 comprises, in step 802, for each of a plurality of training vectors, determining a distance between a first point represented by the test vector and a respective point represented by the training vector using a method of determining a distance according to any example provided herein, such as for example the method 400 described above.

The method 800 also comprises, in step 804, classifying the test vector based on the determined distances. In some examples, classifying the test vector based on the determined distances comprises determining the smallest of the plurality of determined distances (and hence, for example, the nearest centroid to the test vector may be determined). In some examples, a quantum computing device may be used to determine each of the distances. The method 800 itself may be implemented for example on a computing device, such as a classical computing device.

Another embodiment disclosed herein may perform classification of a test vector (e.g. clustering) using a constant depth circuit. This example may use rotations of qubits to find the nearest centroid (or training vector) to a test vector. Given a test vector t and two centroids $\{c_1, c_2\}$, methods may determine which of the two centroids is closer to t. The closer of the two centroids (or training vectors) would have a smaller angular difference between the centroid and the test vector, so if for example $|\theta_t - \theta_{c1}|$ is less than $|\theta_t - \theta_{c2}|$ then it may be concluded that t is closer to the first centroid or training vector $c_1$, else it is closer to the second centroid or training vector $c_2$.

To implement such examples using a quantum computing device, we may need to take into account the probabilities of a qubit being in state $|0\rangle$ and state $|1\rangle$. Provided that the probability of a qubit being in state $|0\rangle$ is higher for vectors close to x-axis, this can be used as a metric to determine which centroid is closer to the test vector. The probability of the qubit in state $|0\rangle$ may be higher for test and training vectors that are close together, and the probability of state $|1\rangle$ may be higher when the vectors are far apart. The maximum (magnitude) angle between two vectors is 180°, meaning when the vectors are at maximum distance apart (assuming for example unit or equal length vectors) the angle between them is 180°.

$$|\theta_t - \theta_c| \leq 180°$$

A qubit rotated at 180° has 100% probability to be in state $|0\rangle$. However, in some examples disclosed herein, the probability of state $|1\rangle$ may be higher when the vectors are 180° apart. The probability of the qubit being in state $|1\rangle$ may higher for a qubit rotated to 90°. This may be achieved for example by performing rotations by half of the angles associated with the test and training vectors:

$$\left|\frac{\theta_t}{2} - \frac{\theta_c}{2}\right| \leq \frac{180°}{2}$$

Figure 9:
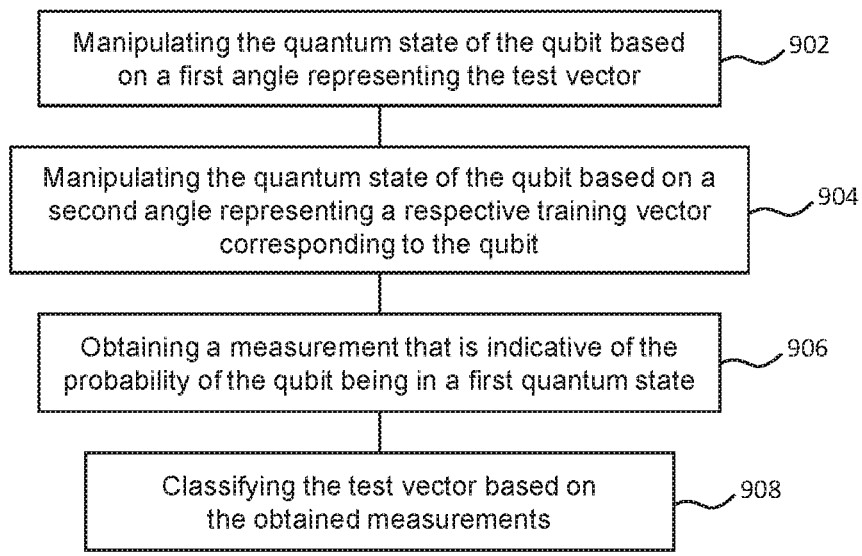
FIG. 9 is a flow chart of an example of a method of classifying a test vector.

FIG. 9 is a flow chart of an example of a method 900 of classifying a test vector, for example in a quantum k-means algorithm, according to these principles. The method 900 comprises performing steps 902, 904 and 906 for each of a plurality of qubits in a quantum computing device. Step 902 of the method 900 comprises manipulating the quantum state of the qubit based on a first angle representing the test vector (e.g. an angle between the test vector and the x-axis). Step 904 comprises manipulating the quantum state of the qubit based on a second angle representing a respective training vector corresponding to the qubit (e.g. the angle between the respective training vector and the x-axis). Step 906 comprises obtaining a measurement that is indicative of the probability of the qubit being in a first quantum state (e.g. $|0\rangle$). Finally, when steps 902-906 have been performed for each qubit, step 908 of the method 900 comprises classifying the test vector based on the obtained measurements.

Figure 10:
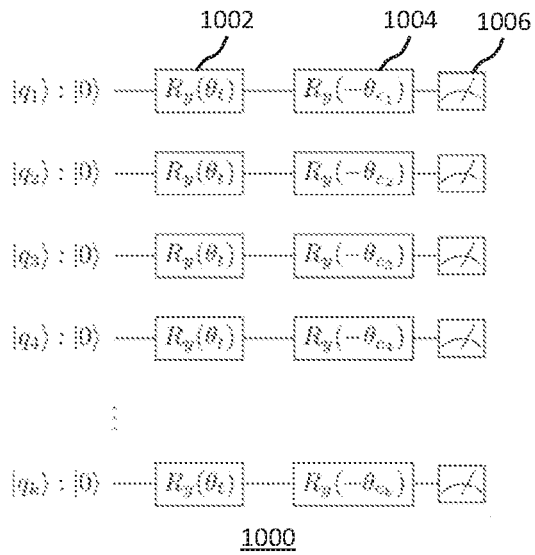
FIG. 10 shows an example of a quantum circuit suitable for performing the method of FIG. 9.

FIG. 10 shows an example of a quantum circuit 1000 suitable for performing the method 900. The quantum circuit 1000 includes a plurality k of qubits $|q_1\rangle, \ldots, |q_k\rangle$. Each qubit has the initial state $|0\rangle$ and includes two rotation gates and a measurement. For example, the first qubit $|q_1\rangle$ includes a first rotation gate 1002 by half the angle $\theta_t$ of the test vector (e.g. between the test vector and the x-axis), noting that $R_y(\theta_t)$ performs a half rotation (i.e. a rotation by half the input angle). The qubit also includes a second rotation gate 1004 by half an angle $-\theta_{c1}$ of the particular training vector associated with the first qubit $|q_1\rangle$. Note that the second rotation gate 1004 rotates by the opposite sign of the angle of the training vector. Finally, a measurement 1006 is performed on the qubit $|q_1\rangle$. Each other qubit has similar gates, whereby the second rotation gate is by an angle of the respective training vector associated with that qubit. Thus, the test vector may be classified into one of k clusters by determining which is the closest of the k training vectors, which may be determined for example by determining the qubit with the maximum probability of being in the $|0\rangle$ state.

In some examples, classifying the test vector based on the obtained measurements comprises determining the qubit where the measurement that is indicative of the probability of that qubit being in the first quantum state (e.g. $|0\rangle$) indicates the maximum of the probabilities for all the qubits.

Manipulating the quantum state of each qubit based on a first angle representing the test vector may comprise for example performing a first rotation operation on the qubit by the first angle. Additionally or alternatively, manipulating the quantum state of each qubit based on a second angle representing a respective training vector corresponding to the qubit may comprise for example performing a second rotation operation on the qubit by the second angle. The second angle may comprise the opposite sign to the angle formed between the respective training vector and the x-axis (e.g. the negative of the training vector angle as suggested above).

In some examples, the magnitude of the first angle is half the magnitude of the angle formed between the test vector and the x-axis, and the magnitude of the second angle is half the magnitude of the angle between the respective training vector and the x-axis.

In some examples, there may be multiple test vectors. Classifying these may be achieved for example by executing the circuit 1000 multiple times, with a different test vector each time. However, alternatively, the quantum computing device may include a plurality of further qubits, such that there are nk qubits, where k is the number of training vectors and n is the number of test vectors. The method 900 may therefore also include, for each further qubit, manipulating the quantum state of the further qubit based on a first angle representing a further test vector, manipulating the quantum state of the further qubit based on a second angle representing a respective one of the training vectors corresponding to the further qubit, and obtaining a measurement that is indicative of the probability of the further qubit being in a first quantum state. The method 900 may then also comprise classifying the further test vector based on the obtained measurements.

Figure 11:
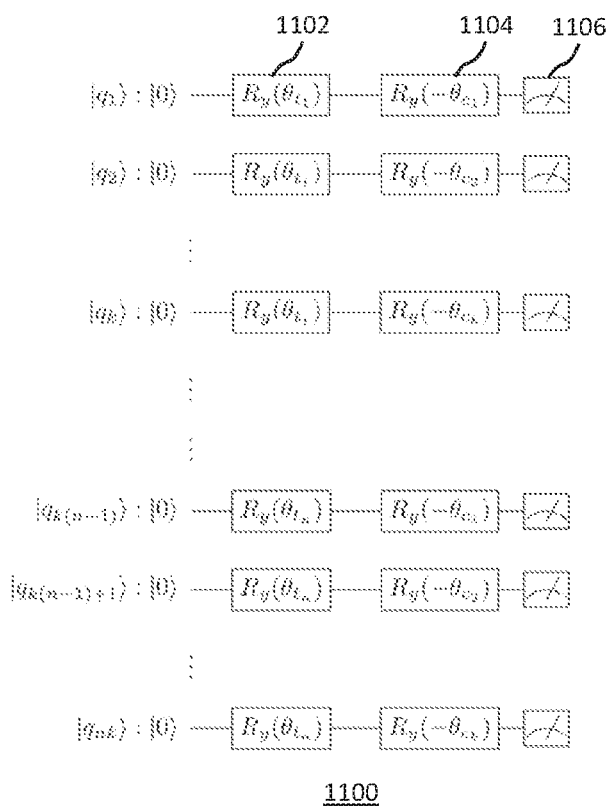
FIG. 11 shows an example of a quantum circuit suitable for performing the method of FIG. 9.

FIG. 11 shows an example of a quantum circuit 1100 that may implement such embodiments. The circuit 1100 includes nk qubits with initial state $|0\rangle$. Each qubit includes a rotation (e.g. using a rotation gate 1102) associated with one of the test vectors and a rotation (e.g. using a rotation gate 1104) associated with one of the training vectors, such that all combinations of test and training vectors are achieved. The rotations on each qubit are followed by a measurement 1106. Each test vector may be classified for example by determining the qubit that includes a rotation based on that test vector that has a highest probability of being in the $|0\rangle$ state. Therefore, for example, classifying the further test vector based on the obtained measurements comprises determining the further qubit where the measurement that is indicative of the probability of that further qubit being in the first quantum state indicates the maximum of the probabilities for all the further qubits.

Figure 12:
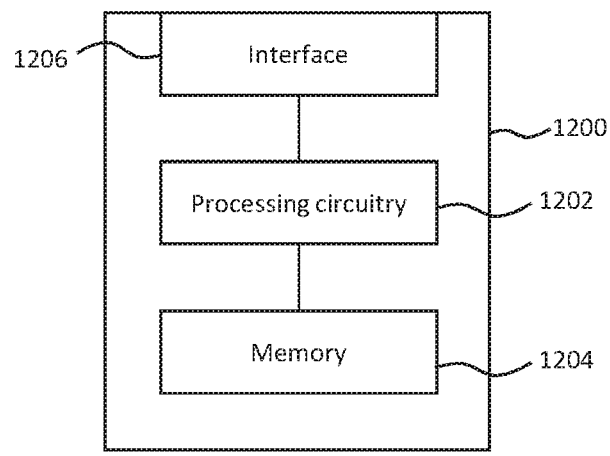
FIG. 12 is a schematic of an example of an apparatus for determining a distance between a first point and a second point.

FIG. 12 is a schematic of an example of an apparatus 1200 for determining a distance between a first point and a second point. In some examples, the apparatus 1200 may be configured to perform the method 400 described above with reference to FIG. 4. The apparatus 1200 comprises a processor 1202 and a memory 1204 in communication with the processor 1202. The memory 1204 contains instructions executable by the processor 1202. The apparatus 1200 may also comprise an interface 1206 in communication with the processing circuitry 1202. Although the interface 1206, processing circuitry 1202 and memory 1204 are shown connected in series, these may alternatively be interconnected in any other way, for example via a bus.

In one embodiment, the memory 1204 contains instructions executable by the processor 1202 such that the apparatus 1200 is operable to manipulate quantum states of at least first and second qubits of a quantum computing device based on a test vector representing the first point and a training vector representing the second point, perform quantum interference between the test vector and the training vector, perform a measurement on one or more of the qubits, and determine the distance from the measurement.

Figure 13:
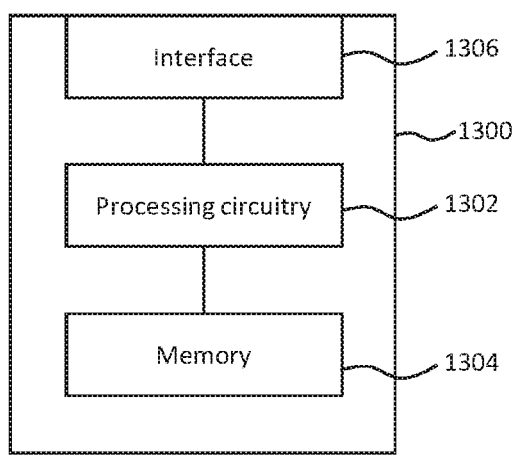
FIG. 13 is a schematic of an example of an apparatus for classifying a test vector.

FIG. 13 is a schematic of an example of an apparatus 1300 for classifying a test vector. In some examples, the apparatus 1300 may be configured to perform the method 800 described above with reference to FIG. 8. The apparatus 1300 comprises a processor 1302 and a memory 1304 in communication with the processor 1302. The memory 1304 contains instructions executable by the processor 1302. The apparatus 1300 may also comprise an interface 1306 in communication with the processing circuitry 1302. Although the interface 1306, processing circuitry 1302 and memory 1304 are shown connected in series, these may alternatively be interconnected in any other way, for example via a bus.

In one embodiment, the memory 1304 contains instructions executable by the processor 1302 such that the apparatus 1300 is operable to, for each of a plurality of training vectors, determine a distance between a first point represented by the test vector and a respective point represented by the training vector using any example of the method of FIG. 4. The memory 1304 also contains instructions executable by the processor 1302 such that the apparatus 1300 is operable to classify the test vector based on the determined distances.

Figure 14:
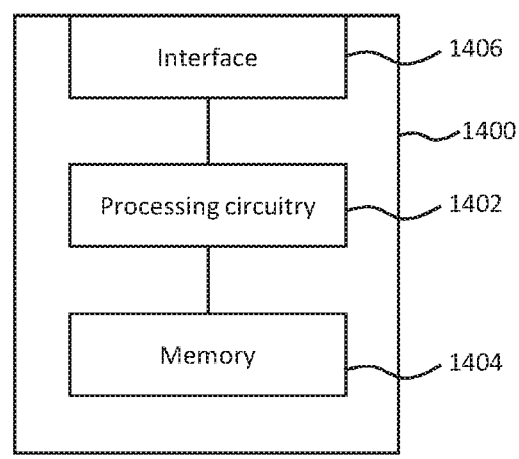
FIG. 14 is a schematic of an example of an apparatus for classifying a test vector.

FIG. 14 is a schematic of an example of an apparatus 1400 for classifying a test vector. In some examples, the apparatus 1400 may be configured to perform the method 900 described above with reference to FIG. 9. The apparatus 1400 comprises a processor 1402 and a memory 1404 in communication with the processor 1402. The memory 1404 contains instructions executable by the processor 1402. The apparatus 1400 may also comprise an interface 1406 in communication with the processing circuitry 1402. Although the interface 1406, processing circuitry 1402 and memory 1404 are shown connected in series, these may alternatively be interconnected in any other way, for example via a bus.

In one embodiment, the memory 1404 contains instructions executable by the processor 1402 such that the apparatus 1400 is operable to, for each of a plurality of qubits in a quantum computing device:
  a) manipulate the quantum state of the qubit based on a first angle representing the test vector;
  b) manipulate the quantum state of the qubit based on a second angle representing a respective training vector corresponding to the qubit; and
  c) obtain a measurement that is indicative of the probability of the qubit being in a first quantum state,
  and the memory 1404 contains instructions executable by the processor 1402 such that the apparatus 1400 is further operable to:
  d) classify the test vector based on the obtained measurements.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim or embodiment, "a" or "an" does not exclude a plurality, and a single processor or other unit may fulfil the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

EMBODIMENTS

Also provided are the following example embodiments.

Embodiment 1

A method of determining a distance between a first point and a second point, the method comprising:
  manipulating quantum states of at least first and second qubits of a quantum computing device based on a test vector representing the first point and a training vector representing the second point;
  performing quantum interference between the test vector and the training vector;
  performing a measurement on one or more of the qubits; and
  determining the distance from the measurement.

Embodiment 2

The method of embodiment 1, wherein the step of manipulating the quantum states of the qubits comprises:
  performing a first rotation operation on the first qubit by a first angle based on the test vector;
  performing a second rotation operation on the first qubit by a second angle based on the test vector;
  performing a third rotation operation on a first qubit by a third angle based on the training vector; and
  performing a fourth rotation operation on a first qubit by a fourth angle based on the training vector.

Embodiment 3

The method of embodiment 2, comprising performing a first controlled NOT, CNOT, operation on the first qubit that is controlled by the second qubit, wherein the CNOT operation is performed before the first rotation operation.

Embodiment 4

The method of embodiment 2 or 3, comprising performing a second controlled NOT, CNOT, operation on the first qubit that is controlled by the second qubit, wherein the CNOT operation is performed before the second rotation operation.

Embodiment 5

The method of any of embodiments 2 to 4, comprising performing a third controlled NOT, CNOT, operation on the first qubit that is controlled by the second qubit, wherein the CNOT operation is performed before the third rotation operation.

Embodiment 6

The method of any of embodiments 2 to 5, comprising performing a fourth controlled NOT, CNOT, operation on the first qubit that is controlled by the second qubit, wherein the CNOT operation is performed before the fourth rotation operation.

Embodiment 7

The method of any of embodiments 2 to 6, comprising performing a NOT operation on the second qubit, wherein the NOT operation is performed before the third and fourth rotation operations.

Embodiment 8

The method of any of embodiments 2 to 7, wherein the second angle is a negative of the first angle.

Embodiment 9

The method of any of embodiments 2 to 8, wherein the fourth angle is a negative of the third angle.

Embodiment 10

The method of any of embodiments 1 to 9, wherein an initial state of the first qubit and/or the second qubit comprises $|0\rangle$.

Embodiment 11

The method of any of embodiments 1 to 10, wherein manipulating the quantum states of qubits of a quantum computing device comprises one or more of:
  performing a rotation on the first qubit using a first quantum rotation gate based on the test vector;
  performing a rotation on the first qubit using a second quantum rotation gate based on the test vector;
  performing a rotation on the first qubit using a third quantum rotation gate based on the training vector; and performing a rotation on the first qubit using a first fourth quantum rotation gate based on the training vector.

Embodiment 12

The method of embodiment 1, wherein the step of manipulating quantum states of at least first and second qubits of a quantum computing device comprises:
 manipulating the quantum states based on a first vector, wherein the magnitude of the angle between the first vector and a first quantum state is equal to the magnitude of the angle between the test vector and the training vector.

Embodiment 13

The method of embodiment 12, wherein the first quantum state comprises $|0\rangle$.

Embodiment 14

The method of embodiment 12 or 13, wherein the step of manipulating the quantum states of the qubits comprises:
 performing a first rotation operation on a first qubit by a first angle based on the first vector; and
 performing a second rotation operation on the first qubit by a second angle based on the first vector.

Embodiment 15

The method of embodiment 14, comprising performing a first controlled NOT, CNOT, operation on the first qubit that is controlled by the second qubit, wherein the CNOT operation is performed before the first rotation operation.

Embodiment 16

The method of embodiment 14 or 15, comprising performing a second controlled NOT, CNOT, operation on the first qubit that is controlled by the second qubit, wherein the CNOT operation is performed before the second rotation operation.

Embodiment 17

The method of any of embodiments 14 to 16, wherein an initial state of the first qubit and/or the second qubit comprises $|0\rangle$.

Embodiment 18

The method of any of embodiments 14 to 17, wherein the second angle is a negative of the first angle.

Embodiment 19

The method of any of embodiments 12 to 18, wherein manipulating the quantum states of qubits of a quantum computing device comprises one or more of:
 performing a rotation on the first qubit using a first quantum rotation gate based on the first vector; and
 performing a rotation on the first qubit using a second quantum rotation gate based on the first vector.

Embodiment 20

A method of any of embodiments 1 TO 19, wherein the step of performing quantum interference between the test vector and the training vector results in a quantum state of the second qubit wherein a first state of the second qubit represents destructive interference between the test vector and the training vector, and a second state of the second qubit represents constructive interference between the test vector and the training vector.

Embodiment 21

A method of embodiment 20, wherein the first state comprises a $|1\rangle$ state.

Embodiment 22

The method of any of the preceding embodiments, wherein the test vector comprises a normalised version of an unnormalized test vector, and the training vector comprises a normalised version of an unnormalized training vector.

Embodiment 23

The method of embodiment 22, wherein the method further comprises scaling the distance by a factor based on the unnormalized test vector and the unnormalized training vector.

Embodiment 24

The method of embodiment 23, wherein performing a measurement on one or more of the qubits comprises obtaining a measurement that is indicative of a probability of the second qubit being in the $|1\rangle$ state.

Embodiment 25

The method of embodiment 24, wherein determining the distance from the measurement comprises scaling the obtained measurement by the factor Norm×√2, wherein $$\text{Norm} = \sqrt{\sum_{i=0}^{N-1} a_i^2 + \sum_{i=0}^{N-1} b_i^2}$$

Wherein $a_i$, i=(0, 1, ..., N−1) comprises the components of the N dimensional unnormalized test vector, and wherein $b_i$, i=(0, 1, ..., N−1) comprises the components of the N dimensional unnormalized training vector.

Embodiment 26

The method of any of embodiments 1 to 23, wherein performing a measurement on one or more of the qubits comprises obtaining a measurement that is indicative of a probability of the second qubit being in the $|1\rangle$ state.

Embodiment 27

A method of any of embodiments 1 to 26, wherein the method of determining a distance between a first point and a second point comprises determining the distance in a quantum k-means algorithm.

Embodiment 28

A method of any of embodiments 1 to 27, wherein manipulating the quantum states entangles the training vector with a first quantum state of the second qubit, and/or entangles the test vector with a second quantum state of the second qubit.

Embodiment 29

The method of embodiment 28, wherein the first quantum state comprises $|1\rangle$, and the second quantum state comprises $|0\rangle$.

Embodiment 30

The method of any of embodiments 1 to 29, wherein performing a measurement on one or more of the qubits comprises measuring a quantum state of the one or more qubits.

Embodiment 31

The method of embodiments 30, wherein performing a measurement on one or more of the qubits comprises measuring the quantum state.

Embodiment 32

A method of classifying a test vector, the method comprising:
  for each of a plurality of training vectors, determining a distance between a first point represented by the test vector and a respective point represented by the training vector using the method of any of embodiments 1 to 26; and
  classifying the test vector based on the determined distances.

Embodiment 33

The method of embodiment 32, wherein classifying the test vector based on the determined distances comprises determining the smallest of the plurality of determined distances.

Embodiment 34

The method of embodiment 32 or 33, wherein determining a distance, and classifying the test vector based on the determined distances comprises performing a quantum k-means algorithm.

Embodiment 35

The method of any of embodiments 32 to 34, comprising using a quantum computing device to determine each of the distances.

Embodiment 36

The method of any of embodiments 32 to 35, wherein the method is implemented on a computing device.

Embodiment 37

The method of embodiment 36, wherein the computing device is a classical computing device.

Embodiment 38

A method of classifying a test vector, the method comprising the steps of, for each of a plurality of qubits in a quantum computing device:

a) manipulating the quantum state of the qubit based on a first angle representing the test vector;
b) manipulating the quantum state of the qubit based on a second angle representing a respective training vector corresponding to the qubit; and
c) obtaining a measurement that is indicative of the probability of the qubit being in a first quantum state, and the method further comprises the step of:
d) classifying the test vector based on the obtained measurements.

Embodiment 39

A method according to embodiment 38, wherein classifying the test vector based on the obtained measurements comprises determining the qubit where the measurement that is indicative of the probability of that qubit being in the first quantum state indicates the maximum of the probabilities for all the qubits.

Embodiment 40

The method of embodiment 38 or 39, wherein the first quantum state comprises $|0\rangle$.

Embodiment 41

A method according to any of embodiments 38 to 40, wherein manipulating the quantum state of the qubit based on a first angle representing the test vector comprises performing a first rotation operation on the qubit by the first angle.

Embodiment 42

A method according to any of embodiments 38 to 41, wherein manipulating the quantum state of the qubit based on a second angle representing a respective training vector corresponding to the qubit comprises performing a second rotation operation on the qubit by the second angle.

Embodiment 43

A method of embodiment 42, wherein the second angle comprises the opposite sign to the angle formed between the respective training vector and the x-axis.

Embodiment 44

A method of any of embodiments 38 to 43 wherein the magnitude of the first angle is half the magnitude of the angle formed between the test vector and the x-axis, and the magnitude of the second angle is half the magnitude of the angle between the respective training vector and the x-axis.

Embodiment 45

The method of any of embodiments 38 to 44, wherein an initial state of each qubit comprises $|0\rangle$.

Embodiment 46

The method of any of embodiments 38 to 45, wherein, for each qubit, obtaining a measurement that is indicative of the probability of the qubit being in the first quantum state comprises measuring a quantum state of the qubit.

Embodiment 47

The method of any of embodiments 38 to 46, wherein the steps a)-d) comprise performing a quantum k-means algorithm.

Embodiment 48

The method of any of embodiments 38 to 47, wherein the quantum computing device comprises a plurality of further qubits, and the method comprises classifying a further test vector by, for each further qubit:
e) manipulating the quantum state of the further qubit based on a first angle representing a further test vector;
f) manipulating the quantum state of the further qubit based on a second angle representing a respective one of the training vectors corresponding to the further qubit;
g) obtaining a measurement that is indicative of the probability of the further qubit being in a first quantum state,
and the method further comprises the step of:
h) classifying the further test vector based on the obtained measurements.

Embodiment 49

A method according to embodiment 48, wherein classifying the further test vector based on the obtained measurements comprises determining the further qubit where the measurement that is indicative of the probability of that further qubit being in the first quantum state indicates the maximum of the probabilities for all the further qubits.

Embodiment 50

The method of any of embodiments 38 to 49, comprising using a quantum computing device to obtain, for each qubit, the measurement that is indicative of the probability of the qubit being in a first quantum state.

Embodiment 51

The method of any of embodiments 38 to 50, wherein the method is implemented on a computing device.

Embodiment 52

A computer program comprising instructions which, when executed on at least one processor, cause the at least one processor to carry out a method according to any one of embodiments 1 to 51.

Embodiment 53

A subcarrier containing a computer program according to embodiment 52, wherein the subcarrier comprises one of an electronic signal, optical signal, radio signal or computer readable storage medium.

Embodiment 54

A computer program product comprising non transitory computer readable media having stored thereon a computer program according to embodiment 52.

Embodiment 55

Apparatus for determining a distance between a first point and a second point, the apparatus comprising a processor and a memory, the memory containing instructions executable by the processor such that the apparatus is operable to:
manipulate quantum states of at least first and second qubits of a quantum computing device based on a test vector representing the first point and a training vector representing the second point;
perform quantum interference between the test vector and the training vector;
perform a measurement on one or more of the qubits; and
determine the distance from the measurement.

Embodiment 56

The apparatus of embodiment 55, wherein the memory contains instructions executable by the processor such that the apparatus is operable to perform the method of any of embodiments 2 to 31.

Embodiment 57

Apparatus for classifying a test vector, the apparatus comprising a processor and a memory, the memory containing instructions executable by the processor such that the apparatus is operable to:
for each of a plurality of training vectors, determine a distance between a first point represented by the test vector and a respective point represented by the training vector using the method of any of embodiments 1 to 26; and
classify the test vector based on the determined distances.

Embodiment 58

The apparatus of embodiment 57, wherein the memory contains instructions executable by the processor such that the apparatus is operable to perform the method of any of embodiments 33 to 37.

Embodiment 59

Apparatus for classifying a test vector, the apparatus comprising a processor and a memory, the memory containing instructions executable by the processor such that the apparatus is operable to, for each of a plurality of qubits in a quantum computing device:
a) manipulate the quantum state of the qubit based on a first angle representing the test vector;
b) manipulate the quantum state of the qubit based on a second angle representing a respective training vector corresponding to the qubit; and
c) obtain a measurement that is indicative of the probability of the qubit being in a first quantum state,
and the memory contains instructions executable by the processor such that the apparatus is further operable to:
d) classify the test vector based on the obtained measurements.

Embodiment 60

The apparatus of embodiment 59, wherein the memory contains instructions executable by the processor such that the apparatus is operable to perform the method of any of embodiments 39 to 51.

Embodiment 61

Apparatus for determining a distance between a first point and a second point, the apparatus configured to:

manipulate quantum states of at least first and second qubits of a quantum computing device based on a test vector representing the first point and a training vector representing the second point;
perform quantum interference between the test vector and the training vector;
perform a measurement on one or more of the qubits; and
determine the distance from the measurement.

Embodiment 62

Apparatus for classifying a test vector, the apparatus configured to:
for each of a plurality of training vectors, determine a distance between a first point represented by the test vector and the point represented by the training vector using the method of any of embodiments 1 to 26; and
classify the test vector based on the plurality of determined distances.

Embodiment 63

Apparatus for classifying a test vector, the apparatus configured to, for each of a plurality of qubits in a quantum computing device:
a) manipulate the quantum state of the qubit based on a first angle representing the test vector;
b) manipulate the quantum state of the qubit based on a second angle representing a respective training vector corresponding to the qubit;
c) obtain a measurement that is indicative of the probability of the qubit being in a first quantum state,
and the apparatus is further configured to:
d) classify the test vector based on the obtained measurements.

REFERENCES

The following references are incorporated herein by reference.
[1] M. Schuld, I. Sinayskiy, and F. Petruccione, "An introduction to quantum machine learning," Contemporary Physics, vol. 56, no. 2, pp. 172-185, 2015. doi: 10.1080/00107514.2014.964942, https://arxiv.org/pdf/1409.3097.pdf
[2] N. Wiebe, A. Kapoor, and K. M. Svore, "Quantum algorithms for nearest-neighbor methods for supervised and unsupervised learning," Quantum Information Computation, vol. 15, no. 3-4, p. 316-356, 2015, https://arxiv.org/pdf/1401.2142.pdf
[3] E. Aimeur, G. Brassard, and S. Gambs, "Quantum speed-up for unsupervised learning," machine Learning, vol. 90, no. 2, pp. 261-287, 2013. doi: 10.1007/s10994-012-5316-5, https://doi.org/10.1007/s10994-012-5316-5
[4] P. Rebentrost, M. Mohseni, and S. Lloyd, "Quantum support vector machine for big data classification," Physical Review Letters, vol. 113, no. 13, 2014. doi: 10.1103/PhysRevLett.113.130503, https://arxiv.org/pdf/1307.0471.pdf
[5] V. Dunjko, Y.-K. Liu, X. Wu, and J. M. Taylor, "Exponential improvements for quantum-accessible reinforcement learning," ArXiv e-prints, 2017, https://arxiv.org/pdf/1710.11160.pdf
[6] Preskill, "Quantum computing in the nisq era and beyond," Quantum, vol. 2, p. 79, 1995, https://arxiv.org/abs/1801.00862
[7] S. S. Tannu and M. K. Qureshi, "A case for variability-aware policies for nisq-era quantum computing devices," 2018, https://arxiv.org/abs/1805.10224
[8] A. Barenco, C. H. Bennett, R. Cleve, D. P. DiVincenzo, N. Margolus, P. Shor, T. Sleator, J. Smolin, and H. Weinfurter, "Elementary gates for quantum computation," Physical Review A, vol. 52, no. 5, pp. 3457-3467, 1995, https://arxiv.org/abs/quant-ph/9503016
[9] M. Schuld, M. Fingerhuth, and F. Petruccione, "Implementing a distance-based classifier with a quantum interference circuit," EPL (Europhysics Letters), vol. 119, no. 6, 2017. doi:10.1209/0295-5075/119/60002, https://arxiv.org/pdf/1703.10793.pdf
[10] S. P. Lloyd, "Least squares quantization in pcm," Information Theory, IEEE Transactions, pp. 129-137, 1982, https://ieeexplore.ieee.org/document/1056489
[11] D. Kopczyk, "Quantum machine learning for data scientists," 2018. doi: arXiv:1804.10068, https://arxiv.org/abs/1804.10068
[12] E. Aimeur, G. Brassard, and S. Gambs, "Machine learning in a quantum world," Advances in Artificial Intelligence, Springer, pp. 431-442, 2006.
[13] M. Mttnen, J. Vartiainen, V. Bergholm, and M. M. Salomaa, "Transformation of quantum states using uniformly controlled rotations," Quantum Information and Computation 5, pp. 467-473, 2005.
[14] R. D. P. Niemann and R. Wille, "Logic synthesis for quantum state generation." IEEE 46th International Symposium on Multiple-Valued Logic, Springer, pp. 247-252, 2016
[15] V. Giovannetti, S. Lloyd, and L. Maccone, "Quantum random access memory," Physical Review Letters, vol. 100, no. 16, pp. 1484-1509, 2008. doi: 10.1103/PhysRevLett.100.160501, https://arxiv.org/abs/0708.1879
[16] S. Lloyd, M. Mohseni, and P. Rebentrost, "Quantum algorithms for supervised and unsupervised ma-chine learning," arXiv preprint 1307.0411, 2013
[17] C. Durr and P. Hoyer, "A quantum algorithm for finding the minimum," 1996. doi: arXiv:quant-ph/96070148, https://arxiv.org/abs/quant-ph/9607014
[18] V. A. Epanechnikov, "Non-parametric estimation of a multivariate probability density," Theory of Probability its Applications, pp. 153-158, 1969
[19] A. Elisseeff and J. Weston, "A kernel method for multi-labelled classification," Advances in neural information processing systems, pp. 681-687, 2002, https://papers.nips.cc/paper/1964-a-kernel-method-for-multi-labelled-classification.pdf
[20] R. A. Fisher, "The use of multiple measurements in taxonomic problems," Annals of Eugenics, 7(2), pp. 179-188, 1936.

What is claimed is:
1. A method of determining a distance between a first point and a second point, the method comprising:
manipulating quantum states of at least first and second qubits of a quantum computing device based on a test vector representing the first point and a training vector representing the second point;
performing quantum interference between the test vector and the training vector;
performing a measurement on one or more of the at least first and second qubits; and
determining the distance from the measurement.
2. The method of claim 1, wherein the step of manipulating the quantum states of the at least first and second qubits comprises:

performing a first rotation operation on the first qubit by a first angle based on the test vector;
performing a second rotation operation on the first qubit by a second angle based on the test vector;
performing a third rotation operation on the first qubit by a third angle based on the training vector; and performing a fourth rotation operation on the first qubit by a fourth angle based on the training vector.

3. The method of claim 1, wherein the step of manipulating the quantum states of the at least first and second qubits of the quantum computing device comprises:
manipulating the quantum states based on a first vector, wherein a magnitude of an angle between the first vector and a first quantum state is equal to a magnitude of an angle between the test vector and the training vector.

4. The method of claim 3, wherein the step of manipulating the quantum states of the at least first and second qubits comprises:
performing a first rotation operation on the first qubit by a first angle based on the first vector; and
performing a second rotation operation on the first qubit by a second angle based on the first vector.

5. The method of claim 1, wherein the step of performing quantum interference between the test vector and the training vector results in a quantum state of the second qubit wherein a first state of the second qubit represents destructive interference between the test vector and the training vector, and a second state of the second qubit represents constructive interference between the test vector and the training vector.

6. The method of claim 1, wherein performing a measurement on one or more of the at least first and second qubits comprises obtaining a measurement that is indicative of a probability of the second qubit being in the $|1\rangle$ state.

7. The method of claim 1, wherein the step of manipulating the quantum states entangles the training vector with a first quantum state of the second qubit, and/or entangles the test vector with a second quantum state of the second qubit.

8. A method of classifying the test vector, the method comprising:
for each of a plurality of training vectors, determining a distance between a first point represented by the test vector and a respective point represented by the training vector using the method of claim 1; and
classifying the test vector based on the determined distances.

9. A computer program comprising instructions which, when executed on at least one processor, cause the at least one processor to carry out the method according to claim 1.

10. An apparatus for classifying a test vector, the apparatus comprising a processor and a memory, the memory containing instructions executable by the processor such that the apparatus is operable to:
for each of a plurality of training vectors, determine a distance between a first point represented by the test vector and a respective point represented by the training vector using the method of claim 1; and
classify the test vector based on the determined distances.

11. An apparatus for determining a distance between a first point and a second point, the apparatus comprising a processor and a memory, the memory containing instructions executable by the processor such that the apparatus is operable to:
manipulate quantum states of at least first and second qubits of a quantum computing device based on a test vector representing the first point and a training vector representing the second point;
perform quantum interference between the test vector and the training vector;
perform a measurement on one or more of the at least first and second qubits; and
determine the distance from the measurement.

12. The apparatus of claim 11, wherein the instructions executable by the processor operate the apparatus to manipulate the quantum states of the at least first and second qubits comprises to:
perform a first rotation operation on the first qubit by a first angle based on the test vector;
perform a second rotation operation on the first qubit by a second angle based on the test vector;
perform a third rotation operation on the first qubit by a third angle based on the training vector; and
perform a fourth rotation operation on the first qubit by a fourth angle based on the training vector.

13. The apparatus of claim 11, wherein the instructions executable by the processor operate the apparatus to manipulate the quantum states of the at least first and second qubits comprises to:
manipulate the quantum states based on a first vector, wherein a magnitude of an angle between the first vector and a first quantum state is equal to a magnitude of an angle between the test vector and the training vector.

14. The apparatus of claim 13, wherein the instructions executable by the processor operate the apparatus to manipulate the quantum states of the at least first and second qubits comprises to:
perform a first rotation operation on the first qubit by a first angle based on the first vector; and
perform a second rotation operation on the first qubit by a second angle based on the first vector.

15. The apparatus of claim 11, wherein the instructions executable by the processor operate the apparatus to perform quantum interference between the test vector and the training vector results in a quantum state of the second qubit wherein a first state of the second qubit represents destructive interference between the test vector and the training vector, and a second state of the second qubit represents constructive interference between the test vector and the training vector.

16. The apparatus of claim 11, wherein the instructions executable by the processor operate the apparatus to perform a measurement on one or more of the at least first and second qubits comprises obtaining a measurement that is indicative of a probability of the second qubit being in the $|1\rangle$ state.

17. The apparatus of claim 11, wherein the instructions executable by the processor operate the apparatus to manipulate the quantum states entangles the training vector with a first quantum state of the second qubit, and/or entangles the test vector with a second quantum state of the second qubit.

* * * * *